United States Patent
Parker et al.

(10) Patent No.: US 12,277,186 B2
(45) Date of Patent: Apr. 15, 2025

(54) NAVIGATION BOOKMARKING AND REORDERING THROUGH OPTIMIZED GRAPHICAL USER INTERFACE

(71) Applicant: INTUIT INC., Mountain View, CA (US)

(72) Inventors: Torian Parker, Mableton, GA (US); Wooyang Lee, Edmonton (CA); Logan Sheptycki, Alberta (CA)

(73) Assignee: Intuit Inc., Mountain View, CA (US)

( * ) Notice: Subject to any disclaimer, the term of this patent is extended or adjusted under 35 U.S.C. 154(b) by 123 days.

(21) Appl. No.: 18/240,806

(22) Filed: Aug. 31, 2023

(65) Prior Publication Data

US 2025/0077606 A1    Mar. 6, 2025

(51) Int. Cl.
*G06F 16/955*    (2019.01)
*G06F 3/04817*    (2022.01)
*G06F 3/0482*    (2013.01)
*G06F 3/0486*    (2013.01)

(52) U.S. Cl.
CPC ...... *G06F 16/9562* (2019.01); *G06F 3/04817* (2013.01); *G06F 3/0482* (2013.01); *G06F 3/0486* (2013.01)

(58) Field of Classification Search
CPC ............. G06F 16/9562; G06F 3/04817; G06F 3/0482; G06F 3/0486
See application file for complete search history.

(56) References Cited

U.S. PATENT DOCUMENTS

| | | | |
|---|---|---|---|
| 10,157,235 B2* | 12/2018 | Quintero | G06F 16/285 |
| 2008/0010252 A1* | 1/2008 | Zamir | G06F 16/9535 |
| 2019/0138163 A1* | 5/2019 | Howland | G06F 3/0482 |

* cited by examiner

*Primary Examiner* — Asher D Kells
(74) *Attorney, Agent, or Firm* — Patterson + Sheridan, LLP (57) ABSTRACT

Aspects of the present disclosure provide techniques for providing a graphical user interface for customizable application navigation. Embodiments include displaying a list of pages associated with a software application in a navigation customization screen and receiving selections of two or more pages of the pages as bookmarks. Embodiments include receiving drag and drop input via the navigation customization screen that changes an ordering of the two or more pages within the list of the plurality of pages and receiving a search query comprising a text string. Embodiments include moving one or more pages matching the search query to a top of the list of the pages within the navigation customization screen and displaying an indication in the navigation customization screen that one of the two or more pages also matches the search query without changing the ordering of the two or more pages within the list of the pages.

20 Claims, 5 Drawing Sheets

NAVIGATION BOOKMARKING AND REORDERING THROUGH OPTIMIZED GRAPHICAL USER INTERFACE

INTRODUCTION

Aspects of the present disclosure relate to techniques for optimized graphical user interface screens for navigation customization. In particular, techniques described herein involve providing a navigation customization screen that allows a user to dynamically select, reorder, and search for available application pages for inclusion in a customizable navigation menu.

BACKGROUND

Every year millions of people, businesses, and organizations around the world utilize software applications to assist with countless aspects of life. In some cases, a software application may have a large number of pages, and it may be difficult for a user to identify a particular page of interest. Many applications incorporate menus or sidebars that allow a user to more easily navigate the application. These existing navigational menus, however, are often unintuitive and/or static in content, and may result in inefficiencies for a user as they struggle to find a page of interest. Furthermore, existing techniques for customizing application navigation menus, such as configuring bookmarks in a web browser or other type of application, generally require a user to separately locate pages to which such bookmarks should correspond and to manually identify those pages based on such locating, and do not provide convenient mechanisms for organizing such bookmarks upon their creation. As such, existing navigational menus may result in inefficient and/or ineffective use of software applications.

As such, there is a need in the art for improved user interface screens related to application navigation.

BRIEF SUMMARY

Certain embodiments provide a method for providing a graphical user interface for customizable application navigation. The method generally includes: displaying a list of a plurality of pages associated with a software application in a navigation customization screen; receiving, within the navigation customization screen, selections of two or more pages of the plurality of pages as bookmarks; receiving drag and drop input via the navigation customization screen that changes an ordering of the two or more pages within the list of the plurality of pages; receiving, via a search field on the navigation customization screen, a search query comprising a text string; moving one or more pages matching the search query to a top of the list of the plurality of pages within the navigation customization screen; displaying an indication in the navigation customization screen that one of the two or more pages also matches the search query without changing the ordering of the two or more pages within the list of the plurality of pages; and displaying the two or more pages as the bookmarks in a navigation menu that is different from the navigation customization screen according to the ordering specified via the drag and drop input.

Other embodiments provide a system comprising one or more processors and a non-transitory computer-readable medium comprising instructions that, when executed by the one or more processors, cause the system to perform a method. The method generally includes: displaying a list of a plurality of pages associated with a software application in a navigation customization screen; receiving, within the navigation customization screen, selections of two or more pages of the plurality of pages as bookmarks; receiving drag and drop input via the navigation customization screen that changes an ordering of the two or more pages within the list of the plurality of pages; receiving, via a search field on the navigation customization screen, a search query comprising a text string; moving one or more pages matching the search query to a top of the list of the plurality of pages within the navigation customization screen; displaying an indication in the navigation customization screen that one of the two or more pages also matches the search query without changing the ordering of the two or more pages within the list of the plurality of pages; and displaying the two or more pages as the bookmarks in a navigation menu that is different from the navigation customization screen according to the ordering specified via the drag and drop input.

Other embodiments provide a non-transitory computer-readable medium comprising instructions that, when executed by one or more processors of a computing system, cause the computing system to perform a method. The method generally includes, displaying a list of a plurality of pages associated with a software application in a navigation customization screen; receiving, within the navigation customization screen, selections of two or more pages of the plurality of pages as bookmarks; receiving drag and drop input via the navigation customization screen that changes an ordering of the two or more pages within the list of the plurality of pages; receiving, via a search field on the navigation customization screen, a search query comprising a text string; moving one or more pages matching the search query to a top of the list of the plurality of pages within the navigation customization screen; displaying an indication in the navigation customization screen that one of the two or more pages also matches the search query without changing the ordering of the two or more pages within the list of the plurality of pages; and displaying the two or more pages as the bookmarks in a navigation menu that is different from the navigation customization screen according to the ordering specified via the drag and drop input.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for optimized graphical user interface screens for navigation customization.

Software applications may include large amounts of content, and it may be difficult for users to identify and/or navigate to relevant content when needed. Existing navigation menus of software applications are typically static and/or unintuitive, and may provide limited benefit to users. According to embodiments of the present disclosure, an optimized navigation customization screen is provided via a user interface to allow a user to conveniently search for, select, and organize bookmarks for inclusion in an application navigation menu, thus providing improved application functionality, improved utilization of screen space, and an avoidance of the utilization of computing resources that would otherwise be associated with inefficient application navigation.

From a navigation menu where bookmarks are listed, a user is able to bring up a user interface screen for customizing the navigation menu (e.g., by selecting a user interface element), as described in more detail below with respect to FIG. 3. The user will then be presented with a navigation customization screen that includes a list of pages available to that particular user (e.g., which may include all pages of an application or a subset of pages of the application, such as those to which the particular user has access), as described in more detail below with respect to FIGS. 1 and 2. For example, references herein to a "page" being displayed within the list in the navigation customization screen or within the navigation menu may refer to an identifier of the page being displayed, such as a name or description of the page. Whether a page is available to the user may be determined, for example, based on the service or services to which the user has been granted access (e.g., based on permissions, purchases, subscriptions, and/or the like). The pages may be ordered in the list alphabetically and/or according to one or more other ordering conditions (e.g., which may be configurable by the user). The navigation customization screen may allow the user to select and/or unselect pages for inclusion in the navigation menu. For example, one or more user interface elements such as checkboxes adjacent to the pages in the list may, when selected or unselected by the user, cause the corresponding pages to be selected or unselected as bookmarks.

In certain embodiments, the navigation customization screen provides user interface controls that allow the user to specify an ordering of pages that are selected as bookmarks. For example, the user may be enabled to provide drag and drop input that changes the ordering of pages that have been selected as bookmarks within the list of pages displayed in the navigation customization screen. In some embodiments this is accomplished by clicking and holding an interactive element adjacent to a selected page while moving the selected page along the column of selected pages until the selected page is at a desired location in reference to the other selected pages (e.g., above or below another selected page). The ordering of selected pages indicated by the user via the navigation customization screen may dictate the order in which the bookmarks are displayed within the navigation menu.

The navigation customization screen allows the user to search through available pages by typing in one or more characters into a natural language search bar. When a search is performed, results matching characters in the search bar are indicated through ordering and/or formatting while a user-specified order of selected pages (e.g., pages selected by the user as bookmarks) is maintained. For example, any unselected pages that match the search criteria are displayed at the top of the list (e.g., immediately below the search bar), followed by selected pages in the order defined by the user (e.g., regardless of whether any of the selected pages match the search criteria). Even if one of the selected pages contains characters matching the search, it will remain in its user-prescribed position within the selected pages so that the user-specified ordering of selected pages is not disturbed. All unselected pages not matching any of the search criteria will remain at the bottom of the list of pages (e.g., organized alphabetically and/or according to some other ordering condition or conditions configured by the user) but are still available for the user to scroll through and select. Characters within displayed identifiers of pages matching those entered in the search bar may be formatted differently (e.g., shown in bold, italicized, underlined, highlighted, and/or the like) to call attention to the match while still maintaining the order described above, as described in more detail below with respect to FIG. 2. The navigation customization screen may include one or more user interface controls (e.g., directional arrows) that allow the user to "toggle" between search results within the displayed list of pages. For example, selecting a forward or backward arrow may cause the list to scroll (as needed) through the list of pages so that a next matching result in a forwards or backwards direction is displayed within the screen, and that matching result may be highlighted or otherwise emphasized so that the user can easily identify that the matching result contains characters that match the search criteria. A number of pages that match the search criteria may also be displayed within the navigation customization screen, such as indicating to the user how many search results exist within the list of pages (e.g., so that the user can determine whether to scroll and/or utilize directional arrows to toggle through matching results to view matching results that are not currently displayed within the screen). The user can select a page from the list of all available pages regardless of whether the page matches search criteria or whether or not a search was even performed prior to the selection.

Lastly, the navigation customization screen may allow the user to save specified preferences (e.g., selections, unselections, and/or ordering of pages for inclusion as bookmarks in the navigation menu). In some embodiments, a "save" button or other user interface control on the navigation customization screen is configured to, when selected, cause the user's specified preferences to be saved. The navigation customization screen may then be closed, minimized, or otherwise hidden, and the navigation menu will reflect the user's specified preferences, such as listing the selected bookmarks in the prescribed order.

Embodiments of the present disclosure offer several technical improvements over conventional techniques for assisting a user with navigation through pages of an application. For example, while conventional application navigation menus are static, techniques described herein allow an application navigation menu to be efficiently and intuitively tailored specifically to the user's preferred workflow via an optimized navigation customization screen. The customized navigation menu provides readier access to pages that are most relevant to a user within the application. Techniques described herein allow a user to customize not only which bookmarks they wish to have displayed on the navigation menu but also the order in which those bookmarks appear on the navigational menu, and allow the user to do so in a convenient, intuitive manner. This results in numerous advantages in application functionality, computational efficiency, user experience, and utilization of available space on a display screen.

For example, a particular user may have purchased a service or product that provides them with access to thirty pages that may potentially be accessed through associated bookmarks linked on the navigation menu. That user, however, may only regularly use five of those. With techniques described herein, rather than have to scroll through a list of all thirty bookmarks (sorted, for example, alphabetically) to identify and navigate to a relevant page, the user can more efficiently identify and select the bookmark they need from a list that they have not only trimmed to a more manageable size but also ordered according to their own preferences.

In addition, the optimized organization and configuration of the navigation customization screen itself also provides many improvements. Providing a unified navigation customization screen that allows searching, selecting, unselecting, and ordering of pages within a list of all available pages of the application, techniques described herein provide an improved level of efficiency for customizing a navigation menu. By including directional arrows and listing the number of matching pages for a search, as well as changing formatting of matching characters within displayed page identifiers while simultaneously maintaining the prescribed order of selected bookmarks within the displayed list of pages, the navigation customization screen described herein allows the user to more efficiently perform the process by which the navigational menu is customized.

Furthermore, the disclosed techniques improve use of a display device by making better use of screen space on the application customization screen (e g., through optimized ordering of search results within a list of available pages) and on the navigation menu (e.g., by including only those bookmarks selected by a user and in the order specified by the user). Additionally, by providing an optimized, targeted navigation menu that allows a user to more efficiently access relevant pages, techniques described herein avoid the utilization of processing and memory resources that would otherwise be associated with inefficient navigation through pages of an application (e.g., including loading and displaying pages that are not relevant to a user while the user attempts to find a relevant page).

While there are existing techniques for customizing an application navigation menu, such as allowing a user to configure bookmarks, these existing techniques generally require a user to manually locate a page and then specify that page as a bookmark based on such locating, and generally do not allow for the efficient organization of such bookmarks at the time they are created. Techniques described herein provide improved efficiency as compared to such existing techniques by allowing a user to search through all available pages in an intuitive interface, and to conveniently select pages as bookmarks and order such bookmarks within such an interface, while maintaining a user-specified ordering of selected bookmarks regardless of whether any selected bookmarks match any search queries, thus making optimal use of screen space and improving efficiency of the application.

Example User Interface Screens for Navigation Customization

Figure 1:
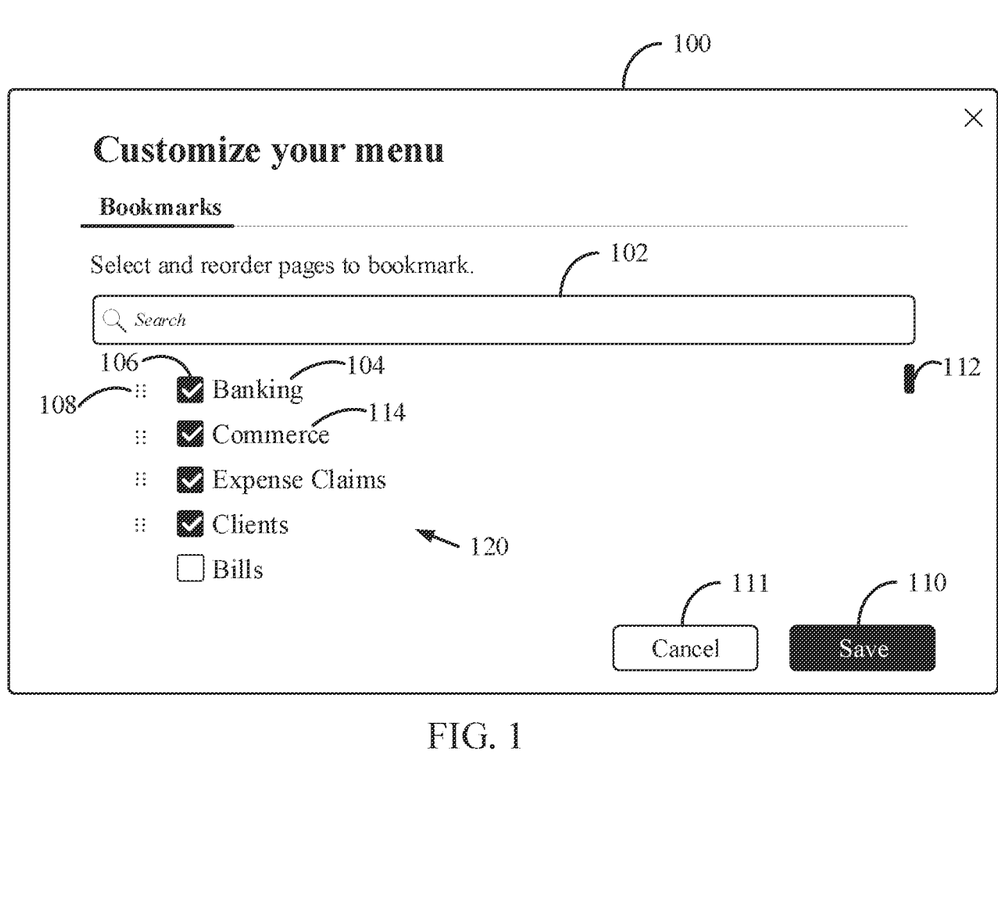
FIG. 1 depicts an example user interface screen related to application navigation customization.

FIG. 1 depicts a screen 100 comprising a user interface for customization of an application navigation menu. For example, screen 100 may be associated with an application that includes a navigation menu (e.g., navigation menu 312 of screen 300 of FIG. 3, described below), and may allow a user to customize the navigation menu by search for, selecting, unselecting, and ordering pages for inclusion in the navigation menu as bookmarks.

Screen 100 includes a list 120 of available pages that can be selected as bookmarks by a given user. List 120 may be scrollable, such as via scroll bar 112, which allows the user to scroll up and down within list 120. For example, list 120 may include other pages that are not currently visible within screen 100, and these other pages may be viewed by using scroll bar 112 to scroll up and/or down through list 120.

The pages included in list 120 may include all of pages of the application to which the user viewing screen 100 has been granted access. Each page in list 120 is indicated by an identifier (e.g., the titles of the pages, such as the title of page 104, "Banking") and is associated with a first user interface (UI) control (e g., UI control 106) that allows the page to be selected or unselected as a bookmark. Each selected page (e.g., a page that has been selected as a bookmark, such as page 104, which has been selected via UI control 106) is associated with a second UI control (e.g., UI control 108) that allows the selected page to be moved relative to other selected pages in order to adjust the ordering of the selected pages within list 120. Adjusting the ordering of selected pages within list 120 causes the bookmarks to be ordered accordingly within the navigation menu. For example, a user may click and drag UI control 108 within list 120 in order to change the position of page 104 relative to other selected pages within list 120 in order to adjust the ordering. In one example, the user may use UI control 108 to drag and drop page 104 ("Banking") below page 114 ("Commerce") within list 120 in order to change the ordering of the selected pages and, consequently, to change the order of the bookmarks (e.g., causing "Banking" to be displayed after "Commerce" in the navigation menu).

Screen 100 further includes a search bar 102 that allows the user to search through list 120, such as by entering characters into search bar 102. For example, entering one or more characters into search bar 102 may cause a search to be performed within the pages in list 120 for pages that include the one or more characters (e.g., in names of the pages). The search functionality of the navigation customization screen is described in more detail below with respect to FIG. 2.

A UI control 110 is configured to, when selected, cause any changes made within screen 100 to be saved, such as propagating such changes to the navigation menu. Another UI control 111 is configured to, when selected, cancel any changes made within screen 100, such as discarding such changes and not propagating them to the navigation menu.

Figure 2:
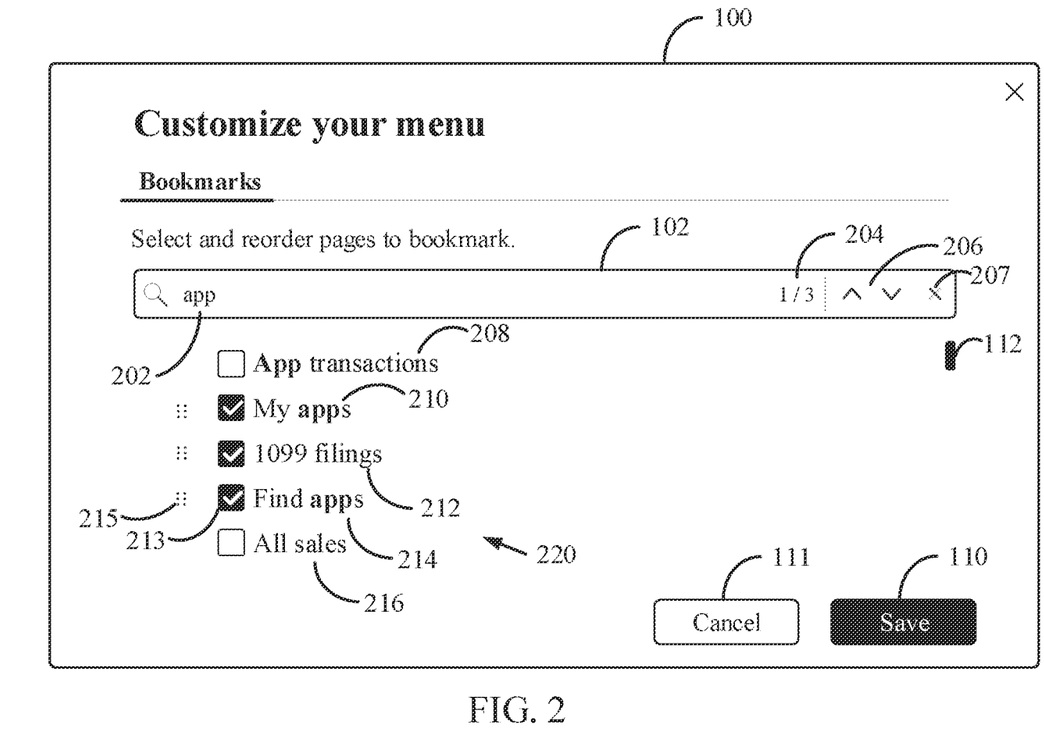
FIG. 2 depicts another example user interface screen related to application navigation customization.

FIG. 2 depicts another example of screen 100 of FIG. 1 comprising a user interface for customization of an application navigation menu. For example, screen 100 may be associated with an application that includes a navigation menu (e.g., navigation menu 312 of screen 300 of FIG. 3, described below), and may allow a user to customize the navigation menu by search for, selecting, unselecting, and ordering pages for inclusion in the navigation menu as bookmarks.

Screen 100 includes a list 220 of available pages that can be selected as bookmarks by a given user, similar to list 120 of FIG. 1. List 120 may be scrollable, such as via scroll bar 112 of FIG. 1, which allows the user to scroll up and down within list 220. Screen 100 further includes search bar 102 and UI control 111 and 110 of FIG. 1.

List 220 includes three selected pages 210, 212, and 214, which have been selected as bookmarks, such as by selecting UI controls (e.g., UI control 213) displayed adjacent to identifiers of the pages within list 220. Selected pages 210, 212, and 214 are arranged in a particular order within list 220. For example, the user may have specified the ordering of selected pages 210, 212, and 214 by selecting and dragging one or more UI controls (e.g., UI control 215).

In FIG. 2, the user has entered a search query 202 (e.g., the text "app") into search bar 102 in order to search through the available pages in list 220 for pages that include the text "app" (e.g., in the title of the page).

Results of the search are shown within list 220 via ordering and formatting. For example, pages within list 220 that match search query 202 and that are not already selected as bookmarks are moved to the top of list 220 (e.g., such matching unselected results may be ordered alphabetically or according to some other condition and displayed above selected pages within list 220). Pages within list 220 that have already been selected as bookmarks are displayed within list 220 in the ordering specified by the user regardless of whether any such pages match search query 202. Pages within list 220 that have not been selected as bookmarks and that do not match search query 202 are displayed beneath selected pages in list 220.

All pages in list 220 that match search query 202 are indicated via formatting. For example, characters within such pages' identifiers (e.g., the displayed names or titles of the pages) that match search query 202 are displayed in different formatting (e.g., bold, italics, underlined, highlighted, and/or the like) as compared to the other characters that do not match search query 202. In the depicted example, pages 208, 210, and 214 match search query 202, and the characters "app" from search query 202 are shown in bold in the displayed names of pages 208, 210, and 214. It is noted that showing such characters in bold is only an example, and other types of formatting may alternatively be used to indicate matching characters.

Page 208, which matches search query 202 by including the text "app" in its title, is the only unselected page in list 220 that matches search query 202, and so it is displayed at the top of list 220, above all selected pages Two of the selected pages, specifically pages 210 and 214, match search query 202, but they are displayed in the user-defined order for the selected pages (e.g., with page 212 remaining between pages 210 and 214 despite page 212 not matching search query 202). Thus, the user-defined ordering of the selected pages is maintained regardless of which pages match search query 202. A user is most likely to be searching for a page that is not yet selected as a bookmark, which is why it may be advantageous to display unselected matching results at the top of the list. If a matching result has already been selected, the matching characters are indicated in the list, but such matching results are not moved to the top of the list, thereby avoiding confusion (e.g., because the user defined the ordering of the selected pages, and does not want to see that ordering changed). The user may, in some embodiments, select a previously unselected matching result (e.g., page 208), and the newly selected page may be added to the list of selected pages (e.g., at the top or bottom of the list of selected pages as a starting point, such as based on configurable parameters).

A total number of matching results for search query 202 is shown in UI element 204. Furthermore, UI element 204 indicates which of the matching results is currently in focus (e.g., highlighted or otherwise indicated by being displayed differently within list 220). For instance, UI element 204 reads "⅓", which indicates that the first of three matching results is currently in focus. UI elements 206 (e.g., directional arrows) allow the user to toggle through the matching results. For example, selecting a down arrow of UI elements 206 may cause the second matching result (e.g., page 210) to be in focus, and UI element 204 may change to read "⅔", which indicates that the second of three matching results is currently in focus. Selecting an up arrow of UI elements 206 may then cause the first matching result (e.g., page 208) to again be in focus. In a different example (not shown) where there were additional matching results not displayed (e.g., because the user would need to scroll down to view those additional matching results), UI elements 204 and 206 would allow the user to identify that there are additional matching results beyond those currently displayed (e.g., because the total number of matching results in UI element 204 would be higher than the currently displayed number of matching results) and to efficiently access those matching results (e.g., by toggling to those results via UI elements 206).

As described above, selecting UI control 110 may cause any changes made within screen 100 to be saved and propagated to the navigation menu, while selecting UI control 111 may cause any such changes to be discarded.

Example Navigation Menu

Figure 3:
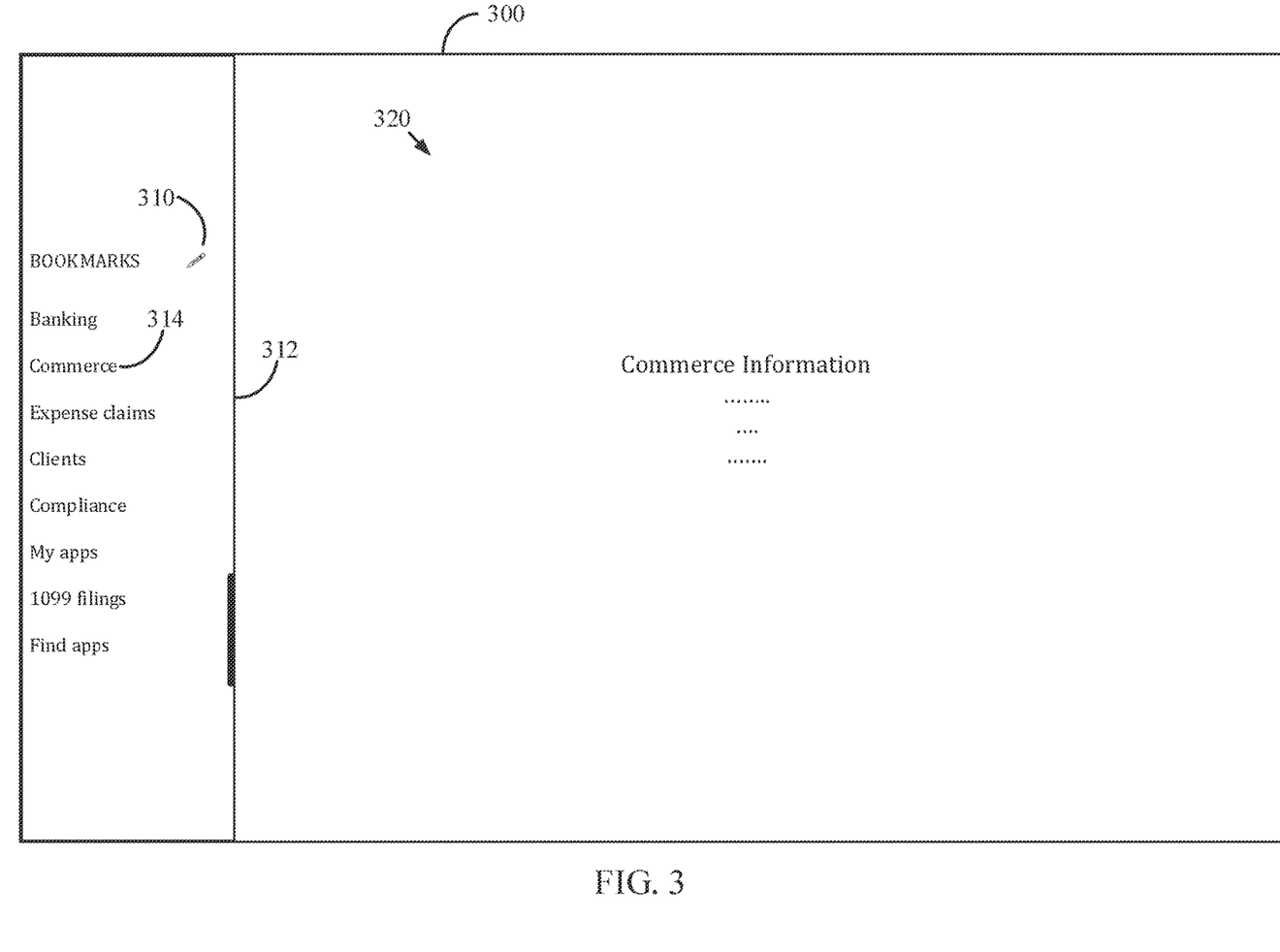
FIG. 3 depicts another example user interface screen related to application navigation customization.

FIG. 3 depicts another example of a screen 300 comprising a user interface that includes a customizable application navigation menu. In particular, screen 300 depicts a navigation menu 312 that is configured to be customized through techniques described herein, such as via screen 100 of FIGS. 1 and 2.

Screen 300 displays an application page (e.g., a "commerce" page) within a panel 320. Screen 300 further includes navigation menu 312, which includes bookmarks that have been selected and ordered by a user via a dynamic, optimized navigation customization screen (e.g., as described above with respect to FIGS. 1 and 2). A UI control 310 within navigation menu 312 may, when selected, cause the navigation customization screen (e.g., screen 100 of FIGS. 1 and 2) to be displayed (e.g., the navigation customization screen may be displayed as a pop up window on top of screen 300, may be displayed within panel 320, may be displayed instead of screen 300, and/or otherwise may be displayed).

The bookmarks within navigation menu 312 are configured to, when selected, cause the indicated pages to be displayed (e.g., within panel 320). For example, selecting bookmark 314 ("commerce") within navigation menu 312 may cause a page named "commerce", which may include information related to commerce, to be displayed within panel 320.

Allowing the bookmarks within navigation menu 312 to be customized in the optimal, dynamic manner described herein provides improved application functionality, improved navigation, improved user experience, and an avoidance of utilizing computing resources that would otherwise be expended in connection with inefficiently and/or ineffectively attempting to navigate to relevant pages within the application.

Example Operations for Application Navigation Customization

Figure 4:
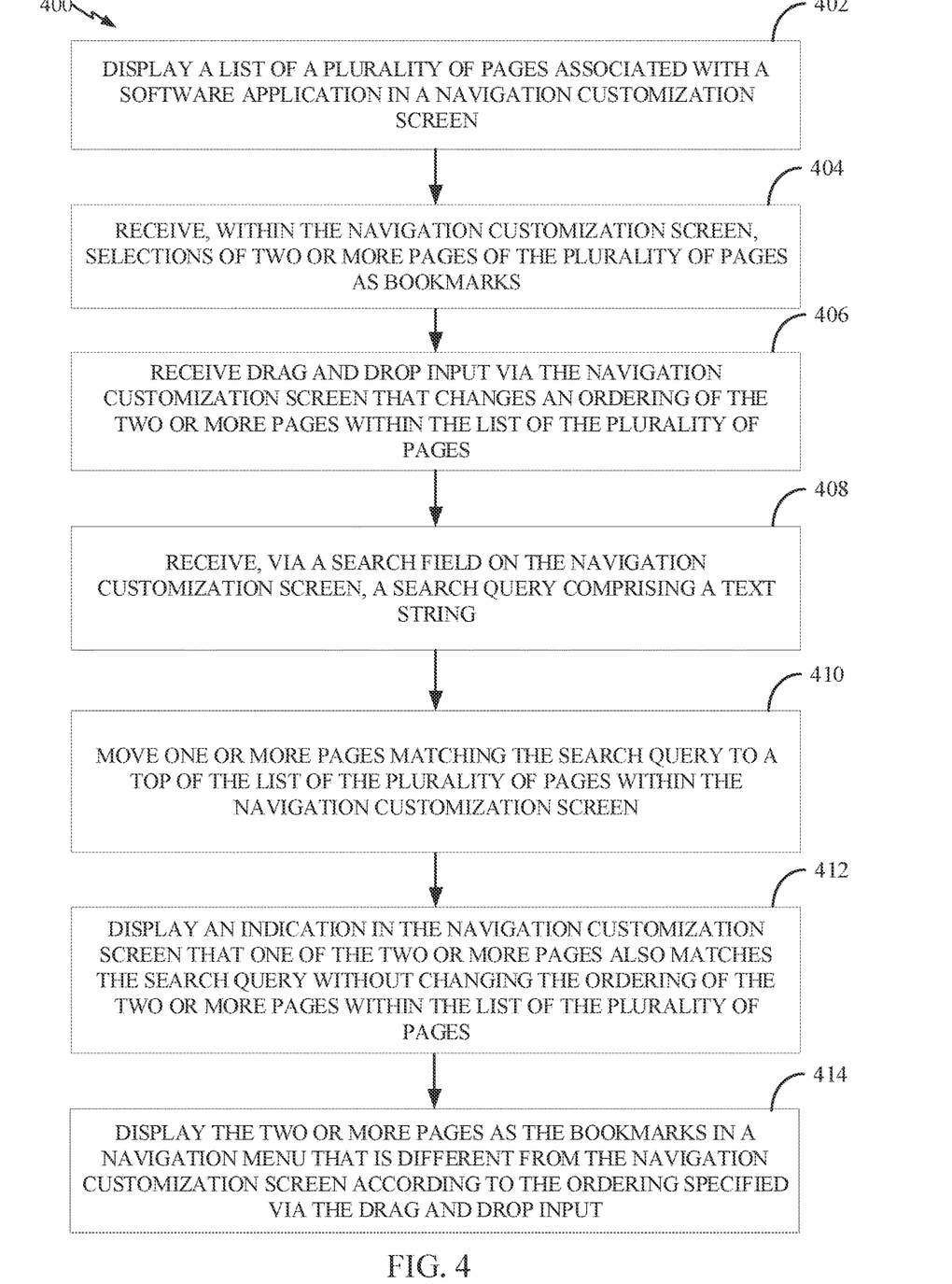
FIG. 4 depicts example operations related to application navigation customization.

FIG. 4 depicts example operations 400 related to application navigation customization. For example, operations 400 may be performed by one or more components of a computing system, such as system 500 of FIG. 5, described below.

Operations 400 begin at step 402 with displaying a list of a plurality of pages associated with a software application in a navigation customization screen.

Operations 400 continue at step 404, with receiving, within the navigation customization screen, selections of two or more pages of the plurality of pages as bookmarks.

In some embodiments, receiving the selections of the two or more pages of the plurality of pages as bookmarks comprises receiving user selections of check boxes displayed adjacent to the two or more pages.

Operations 400 continue at step 406, with receiving drag and drop input via the navigation customization screen that changes an ordering of the two or more pages within the list of the plurality of pages.

In some embodiments, receiving the drag and drop input via the navigation customization screen that changes the ordering of the two or more pages within the list of the plurality of pages comprises receiving a user selection and dragging, to a preferred position, of a user interface control adjacent to a first page of the two or more pages.

Operations 400 continue at step 408, with receiving, via a search field on the navigation customization screen, a search query comprising a text string.

Operations 400 continue at step 410, with moving one or more pages matching the search query to a top of the list of the plurality of pages within the navigation customization screen.

Operations 400 continue at step 412, with displaying an indication in the navigation customization screen that one of the two or more pages also matches the search query without changing the ordering of the two or more pages within the list of the plurality of pages.

In some embodiments, the displaying of the indication in the navigation customization screen that the one of the two or more pages also matches the search query without changing the ordering of the two or more pages within the list of the plurality of pages comprises displaying, within the list of the plurality of pages, between the one or more pages matching the search query and the one of the two or more pages that also matches the search query, a different one of the two or more pages that does not match the search query.

In certain embodiments, the displaying of the indication in the navigation customization screen that the one of the two or more pages also matches the search query comprises changing formatting of one or more characters from the search query in displayed text of the one of the two or more pages that also matches the search query.

Operations 400 continue at step 414, with displaying the two or more pages as the bookmarks in a navigation menu that is different from the navigation customization screen according to the ordering specified via the drag and drop input.

Some embodiments further comprise displaying, in the navigation customization screen, one or more user interface controls that, when selected, toggle between different results of the search query within the list of the plurality of pages.

Certain embodiments further comprise displaying, in the navigation customization screen, a numerical value indicating a number of pages in the list of the plurality of pages that match the search query.

In certain embodiments, the displaying of the two or more pages as the bookmarks in the navigation menu that is different from the navigation customization screen according to the ordering specified via the drag and drop input is based on receiving a selection of a user interface control in the navigation customization screen that, when selected, causes changes in the navigation customization screen to be saved.

Notably, operations 400 is just one example with a selection of example steps, but additional methods with more, fewer, and/or different steps are possible based on the disclosure herein.

Example Computing System

Figure 5:
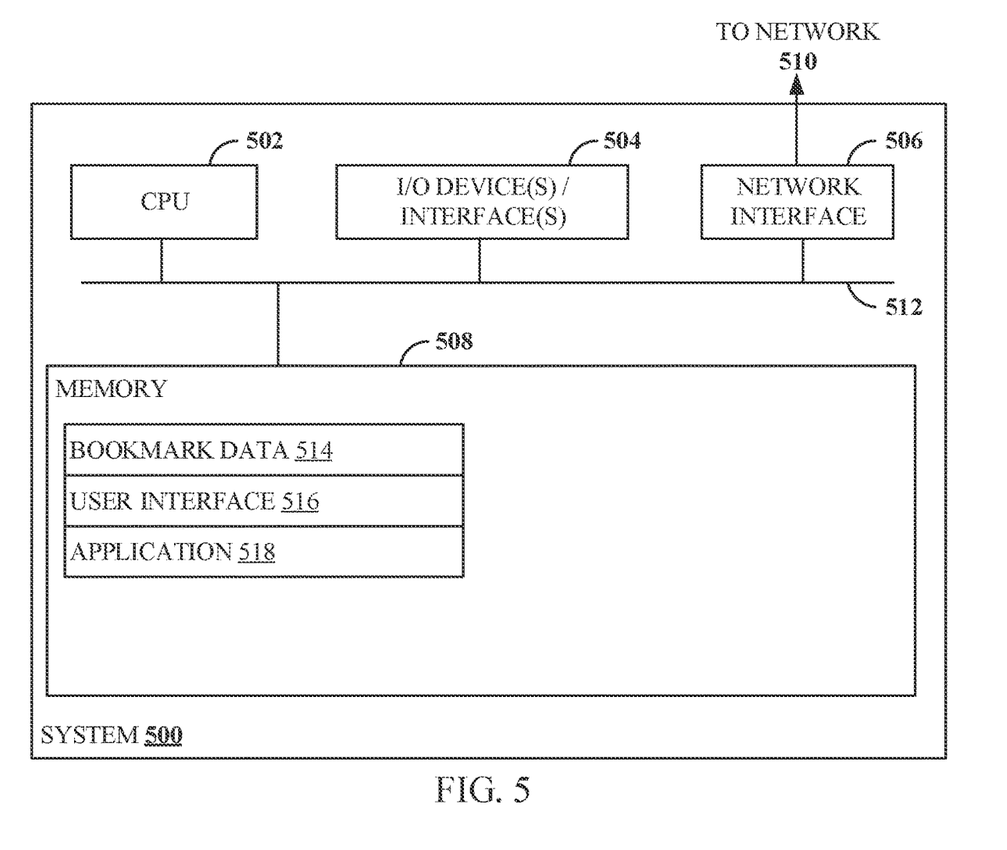
FIG. 5 depicts an example processing system for application navigation customization.

FIG. 5 illustrates an example system 500 with which embodiments of the present disclosure may be implemented. For example, system 500 may be configured to perform operations 400 of FIG. 4.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, and an interconnect 512. It is contemplated that one or more components of system 500 may be located remotely and accessed via a network 110. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes bookmark data 514, which may include data related to customizable bookmarks, such as all available pages of an application (e.g., application 518) as well as information indicating which pages have been selected as bookmarks by a user, and information indicating a user-defined ordering of selected bookmarks.

Memory 508 includes a user interface 516, which may be a user interface of a software application (e.g., application 518), such as corresponding to screens 100 and 300 of FIGS. 1-3. While shown separately, user interface 516 may be part of application 518.

Memory 508 further comprises application 518, which generally represent a software application that includes a plurality of pages through which a user may navigate using a navigation menu customized through a navigation customization screen as described herein.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of providing a graphical user interface for customizable application navigation, the method comprising:
displaying a list of a plurality of pages associated with a software application in a navigation customization screen;
receiving, within the navigation customization screen, selections of two or more pages of the plurality of pages as bookmarks;
receiving drag and drop input via the navigation customization screen that changes an ordering of the two or more pages within the list of the plurality of pages;
receiving, via a search field on the navigation customization screen, a search query comprising a text string;
moving one or more pages matching the search query to a top of the list of the plurality of pages within the navigation customization screen;
displaying an indication in the navigation customization screen that one of the two or more pages also matches the search query without changing the ordering of the two or more pages within the list of the plurality of pages; and
displaying the two or more pages as the bookmarks in a navigation menu that is different from the navigation customization screen according to the ordering specified via the drag and drop input.

2. The method of claim 1, wherein the displaying of the indication in the navigation customization screen that the one of the two or more pages also matches the search query without changing the ordering of the two or more pages within the list of the plurality of pages comprises displaying, within the list of the plurality of pages, between the one or more pages matching the search query and the one of the two or more pages that also matches the search query, a different one of the two or more pages that does not match the search query.

3. The method of claim 1, wherein the displaying of the indication in the navigation customization screen that the one of the two or more pages also matches the search query comprises changing formatting of one or more characters from the search query in displayed text of the one of the two or more pages that also matches the search query.

4. The method of claim 1, further comprising displaying, in the navigation customization screen, one or more user interface controls that, when selected, toggle between different results of the search query within the list of the plurality of pages.

5. The method of claim 1, further comprising displaying, in the navigation customization screen, a numerical value indicating a number of pages in the list of the plurality of pages that match the search query.

6. The method of claim 1, wherein receiving the selections of the two or more pages of the plurality of pages as bookmarks comprises receiving user selections of check boxes displayed adjacent to the two or more pages.

7. The method of claim 1 wherein receiving the drag and drop input via the navigation customization screen that changes the ordering of the two or more pages within the list of the plurality of pages comprises receiving a user selection and dragging, to a preferred position, of a user interface control adjacent to a first page of the two or more pages.

8. The method of claim 1, wherein the displaying of the two or more pages as the bookmarks in the navigation menu that is different from the navigation customization screen according to the ordering specified via the drag and drop input is based on receiving a selection of a user interface control in the navigation customization screen that, when selected, causes changes in the navigation customization screen to be saved.

9. A system for providing a graphical user interface for customizable application navigation, comprising:
one or more processors; and
a memory comprising instructions that, when executed by the one or more processors, cause the system to:
display a list of a plurality of pages associated with a software application in a navigation customization screen;
receive, within the navigation customization screen, selections of two or more pages of the plurality of pages as bookmarks;
receive drag and drop input via the navigation customization screen that changes an ordering of the two or more pages within the list of the plurality of pages;
receive, via a search field on the navigation customization screen, a search query comprising a text string;
move one or more pages matching the search query to a top of the list of the plurality of pages within the navigation customization screen;
display an indication in the navigation customization screen that one of the two or more pages also matches the search query without changing the ordering of the two or more pages within the list of the plurality of pages; and display the two or more pages as the bookmarks in a navigation menu that is different from the navigation customization screen according to the ordering specified via the drag and drop input.

10. The system of claim 9, wherein the displaying of the indication in the navigation customization screen that the one of the two or more pages also matches the search query without changing the ordering of the two or more pages within the list of the plurality of pages comprises displaying, within the list of the plurality of pages, between the one or more pages matching the search query and the one of the two or more pages that also matches the search query, a different one of the two or more pages that does not match the search query.

11. The system of claim 9, wherein the displaying of the indication in the navigation customization screen that the one of the two or more pages also matches the search query comprises changing formatting of one or more characters from the search query in displayed text of the one of the two or more pages that also matches the search query.

12. The system of claim 9, wherein the instructions, when executed by the one or more processors, further cause the system to display, in the navigation customization screen, one or more user interface controls that, when selected, toggle between different results of the search query within the list of the plurality of pages.

13. The system of claim 9, wherein the instructions, when executed by the one or more processors, further cause the system to display, in the navigation customization screen, a numerical value indicating a number of pages in the list of the plurality of pages that match the search query.

14. The system of claim 9, wherein receiving the selections of the two or more pages of the plurality of pages as bookmarks comprises receiving user selections of check boxes displayed adjacent to the two or more pages.

15. The system of claim 9 wherein receiving the drag and drop input via the navigation customization screen that changes the ordering of the two or more pages within the list of the plurality of pages comprises receiving a user selection and dragging, to a preferred position, of a user interface control adjacent to a first page of the two or more pages.

16. The system of claim 9, wherein the displaying of the two or more pages as the bookmarks in the navigation menu that is different from the navigation customization screen according to the ordering specified via the drag and drop input is based on receiving a selection of a user interface control in the navigation customization screen that, when selected, causes changes in the navigation customization screen to be saved.

17. A non-transitory computer-readable medium comprising instructions that, when executed by one or more processors of a computing system, cause the computing system to:

display a list of a plurality of pages associated with a software application in a navigation customization screen;

receive, within the navigation customization screen, selections of two or more pages of the plurality of pages as bookmarks;

receive drag and drop input via the navigation customization screen that changes an ordering of the two or more pages within the list of the plurality of pages;

receive, via a search field on the navigation customization screen, a search query comprising a text string;

move one or more pages matching the search query to a top of the list of the plurality of pages within the navigation customization screen;

display an indication in the navigation customization screen that one of the two or more pages also matches the search query without changing the ordering of the two or more pages within the list of the plurality of pages; and display the two or more pages as the bookmarks in a navigation menu that is different from the navigation customization screen according to the ordering specified via the drag and drop input.

18. The non-transitory computer-readable medium of claim 17, wherein the displaying of the indication in the navigation customization screen that the one of the two or more pages also matches the search query without changing the ordering of the two or more pages within the list of the plurality of pages comprises displaying, within the list of the plurality of pages, between the one or more pages matching the search query and the one of the two or more pages that also matches the search query, a different one of the two or more pages that does not match the search query.

19. The non-transitory computer-readable medium of claim 17, wherein the displaying of the indication in the navigation customization screen that the one of the two or more pages also matches the search query comprises changing formatting of one or more characters from the search query in displayed text of the one of the two or more pages that also matches the search query.

20. The non-transitory computer-readable medium of claim 17, wherein the instructions, when executed by the one or more processors, further cause the system to display, in the navigation customization screen, one or more user interface controls that, when selected, toggle between different results of the search query within the list of the plurality of pages.

* * * * *